RE 24712
July 29, 1958     F. P. MARUGG     2,844,954
WHEEL CLAMP
Filed May 7, 1955
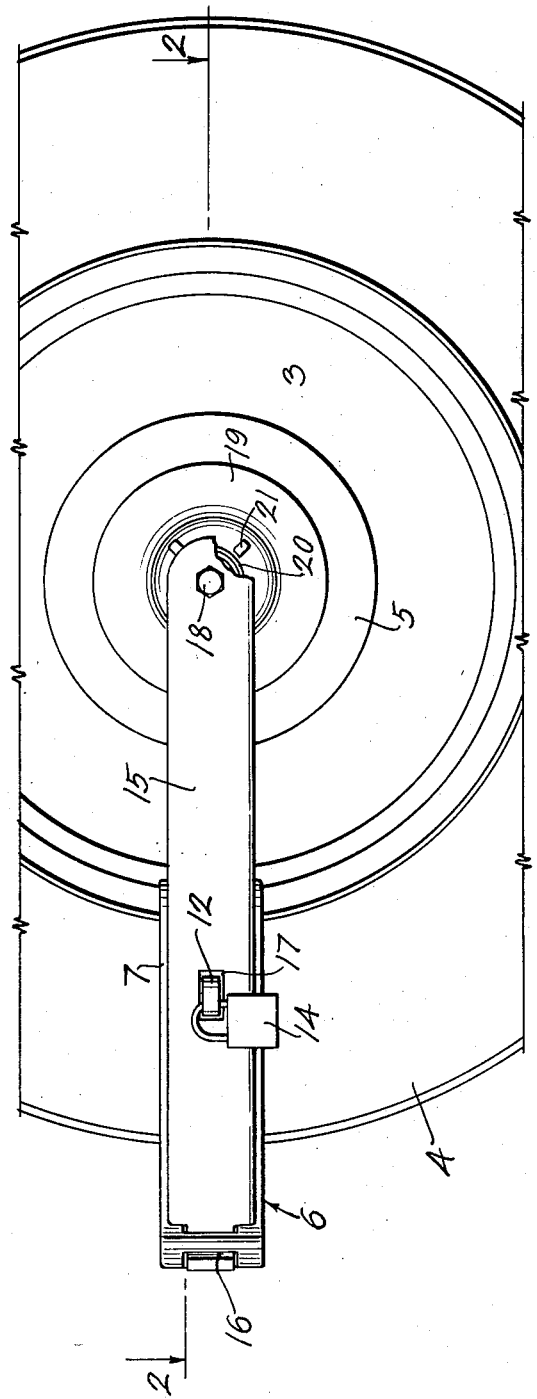
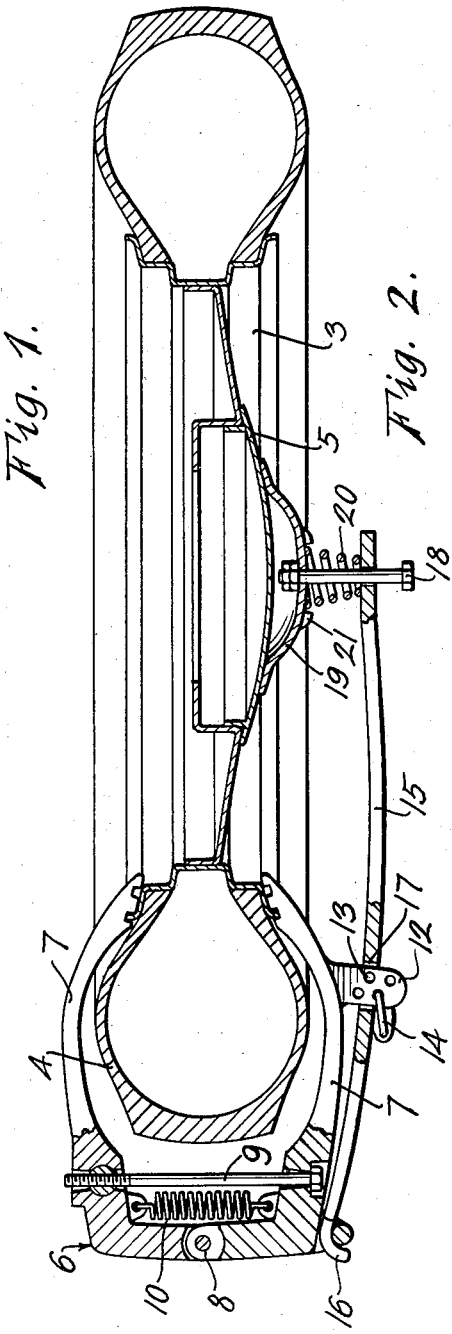
INVENTOR.
FRANK P. MARUGG
BY
ATTORNEY

United States Patent Office 2,844,954
Patented July 29, 1958

2,844,954

WHEEL CLAMP

Frank P. Marugg, Denver, Colo.

Application March 7, 1955, Serial No. 492,523

8 Claims. (Cl. 70—225)

This invention relates to clamps designed to be placed and locked on wheels of automobiles.

A principal object of the invention is to provide such a clamp that can be used by officers of the law to impound cars and thus to prevent their unauthorized use.

Another object is to provide means whereby the lawful owner of a car can immobilize it to prevent theft or for any other reason.

In order to disclose the present inventive concept, reference will now be made to the drawing wherein a clamp made according to this invention is illustrated and in which:

Figure 1 is an elevation of the clamp shown in schematic relationship to a car wheel and locked thereon.

Figure 2 is a cross section taken along line 2—2 of Figure 1.

In the drawing reference character 3 denotes diagrammatically, the wheel of an automobile having a tire 4 and a hubcap 5. The improved clamp 6 is composed of jaws 7, hinged at 8 which can be selectively and forceably drawn together by bolt 9 assisted by tension spring 10.

A lug 12 is an integral part of one jaw 7 and is drilled with a plurality of holes 13 to accommodate a padlock 14. An axially extending arm 15 is hinged to the clamp at 16 and is provided with an opening at 17 through which the lug 12 passes when placed in operative position.

Near the axial extremity of the arm 15, is carried a hardened steel bolt 18, which in turn carries a bell 19 and a spring 20. The bell 19 has a plurality of lugs 21 positioned to engage the spring 20 to centralize the force applied by said spring 20 to the said hubcap 5, via bell 19.

Steel is the presently preferred material for the members of this improved clamp. But any desired material can be used which will resist unauthorized cutting, sawing or otherwise tampering.

In use the clamp assembly 6 is securely tightened upon the wheel of a car around the tire and engaging the wheel. The arm 15 is then positioned so that the spring 20 applies force tending to hold the hubcap in its normal position, by holding the bell 19 firmly against the hubcap. The lock 14 can then be positioned to secure the whole assembly in place until it is unlocked.

Because the head of the bolt 9 is covered from access by means of the arm 15, the entire assembly is under lock by means of the padlock 14. The assembly comprising the arm 15, the hardened bolt 18, the spring 20 and the bell 19, tends to prevent the unauthorized removal of the whole wheel to avoid the immobilizing effect of the clamp. For if the wheel could be removed, then another wheel could be put on the hub and the car driven away.

Thus is disclosed an improved means for securely locking and immobilizing an automobile against unauthorized use. This can be done quickly and easily without access to the interior of the car. In the case of law officers impounding a car, this clamp fills a real need and saves the expense of towing a car to a garage. And for a lawful owner, this clamp provides the means for locking a car safely either inside or outside of a garage.

I claim as my invention:

1. A device for use in immobilizing a vehicle having wheels attached thereto by bolts or the like comprising: clamp means adapted to be attached to the periphery of the wheel to prevent rolling movement thereof over the ground; an arm depending from the clamp means and extending toward the center of the wheel; a bell depending from the arm in position to cover the bolts by which the wheel is attached to the vehicle; compresssion spring means interconnecting the bell and arm urging said bell against the wheel to prevent removal thereof; and, lock means for locking the clamp means, arm and bell in closed position on the wheel.

2. A device for use in immobilizing a vehicle having wheels attached thereto by bolts and a hub cap covering the bolts comprising: clamp means adapted to be attached to the periphery of the wheel in position to prevent rolling movement thereof over the ground; an arm depending from the clamp means extending toward the center of the wheel; spring-biased means depending from the arm acting to hold the hub cap on the wheel in position to cover the bolts and prevent removal of the wheel from the vehicle; and, lock means for locking the clamp and arm in closed position on the wheel.

3. In a device for immobilizing a vehicle having wheels bolted thereon of the type having clamp means embracing the periphery of the wheel, an arm extending to the center of the wheel from the clamp means and a bell depending from the arm in position to cover the bolts, the improvement that comprises: a compression spring between the arm and bell urging said bell against the wheel to prevent removal of said wheel.

4. A device for use in immobilizing vehicles having wheels bolted thereto comprising: a clamp having hinged jaws adapted to close upon the periphery of a wheel and prevent rolling movement thereof over the ground; a bolt threaded through one jaw and threadable into the other jaw to hold the clamp in closed position on the wheel; an arm pivotally attached to the clamp for movement from an open position in which the bolt is exposed for attachment and removal of the clamp to a closed position extending inwardly toward the center of the wheel in which the said arm covers the bolt and prevents removal of the clamp; means depending from the arm positioned and adapted to cover at least one of the wheel-attaching bolts when said arm is in closed position to prevent removal of the wheel from the vehicle; and, lock means interconnecting the arm and clamp to maintain the closed position thereof.

5. A device in accordance with claim 4 in which the means depending from the arm comprises a bell sized to cover at least one of the wheel-attaching bolts.

6. A device in accordance with claim 5 in which a compression spring is mounted between the bell and arm urging said bell into contact with the wheel when said arm is in closed position.

7. A device in accordance with claim 4 in which the lock means comprises a slot in the arm, a lug having at least one opening therein depending from the clamp in position to pass through the slot in the arm when said arm is in closed position and a lock attached through the opening in the lug to secure the arm thereon.

8. A device in accordance with claim 7 in which the lug is provided with a plurality of openings so that the lock may be selectively positioned therein to adjust the position of the arm relative to the wheel and clamp.

References Cited in the file of this patent

UNITED STATES PATENTS

| | | |
|---|---|---|
| 1,524,086 | Doble et al. | Jan. 27, 1925 |
| 1,892,192 | Smith | Dec. 27, 1932 |